United States Patent
Naganuma et al.

(10) Patent No.: US 10,312,532 B2
(45) Date of Patent: Jun. 4, 2019

(54) RESIDUAL WATER SCAVENGING PROCESSING METHOD IN FUEL CELL SYSTEM AND FUEL CELL SYSTEM

(71) Applicant: TOYOTA JIDOSHA KABUSHIKI KAISHA, Toyota-shi, Aichi-ken (JP)

(72) Inventors: Yoshiaki Naganuma, Toyota (JP); Masashi Toida, Nagoya (JP); Tomohiro Ogawa, Toyota (JP); Tsuyoshi Maruo, Toyohashi (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 145 days.

(21) Appl. No.: 14/918,927

(22) Filed: Oct. 21, 2015

(65) Prior Publication Data
US 2016/0133963 A1    May 12, 2016

(30) Foreign Application Priority Data
Nov. 7, 2014   (JP) ................................. 2014-227017

(51) Int. Cl.
*H01M 8/04119* (2016.01)
*H01M 8/04992* (2016.01)
(Continued)

(52) U.S. Cl.
CPC ... *H01M 8/04156* (2013.01); *H01M 8/04179* (2013.01); *H01M 8/04228* (2016.02);
(Continued)

(58) Field of Classification Search
None
See application file for complete search history.

(56) References Cited

U.S. PATENT DOCUMENTS

| 2003/0232226 A1 | 12/2003 | Morishima et al. |
| 2007/0092771 A1* | 4/2007 | Wake ............... H01M 8/04179 |
| | | 429/414 |

(Continued)

FOREIGN PATENT DOCUMENTS

| JP | 2004-022198 A | 1/2004 |
| JP | 2007-095655 A | 4/2007 |

(Continued)

*Primary Examiner* — Sarah A. Slifka
*Assistant Examiner* — Haroon S. Sheikh
(74) *Attorney, Agent, or Firm* — Finnegan, Henderson, Farabow, Garrett & Dunner, LLP

(57) ABSTRACT

A method includes predicting, while fuel cell system is operated, whether or not the outside temperature becomes equal to or less than a first predetermined temperature; performing, when it is predicted that the outside temperature becomes equal to or less than the first predetermined temperature, residual water scavenging processing on only an oxidizer gas supply/discharge mechanism and thereafter stopping the operation of the fuel cell system; predicting, after the stop of the operation of the fuel cell system, whether or not the temperature of a predetermined component included in the fuel cell system becomes equal to or less than a second predetermined temperature; and performing the residual water scavenging processing on the fuel gas supply/discharge mechanism when it is predicted that the temperature of the predetermined component becomes equal to or less than the second predetermined temperature.

8 Claims, 4 Drawing Sheets

(51) Int. Cl.
*H01M 8/04223* (2016.01)
*H01M 8/04228* (2016.01)
*H01M 8/1018* (2016.01)

(52) U.S. Cl.
CPC .......... *H01M 8/04253* (2013.01); *H01M 2008/1095* (2013.01); *H01M 2250/20* (2013.01); *Y02T 90/32* (2013.01)

(56) References Cited

U.S. PATENT DOCUMENTS

2009/0253003 A1    10/2009  Matsumoto et al.
2011/0065012 A1*   3/2011   Kwon ............... H01M 8/04253
                                                           429/429

FOREIGN PATENT DOCUMENTS

| JP | 2008-218242     | 9/2008  |
| JP | 2009-252593 A   | 10/2009 |
| JP | 2009-266689     | 11/2009 |
| JP | 2010-198786     | 9/2010  |
| KR | 10-2011-0028159 A | 3/2011 |

* cited by examiner

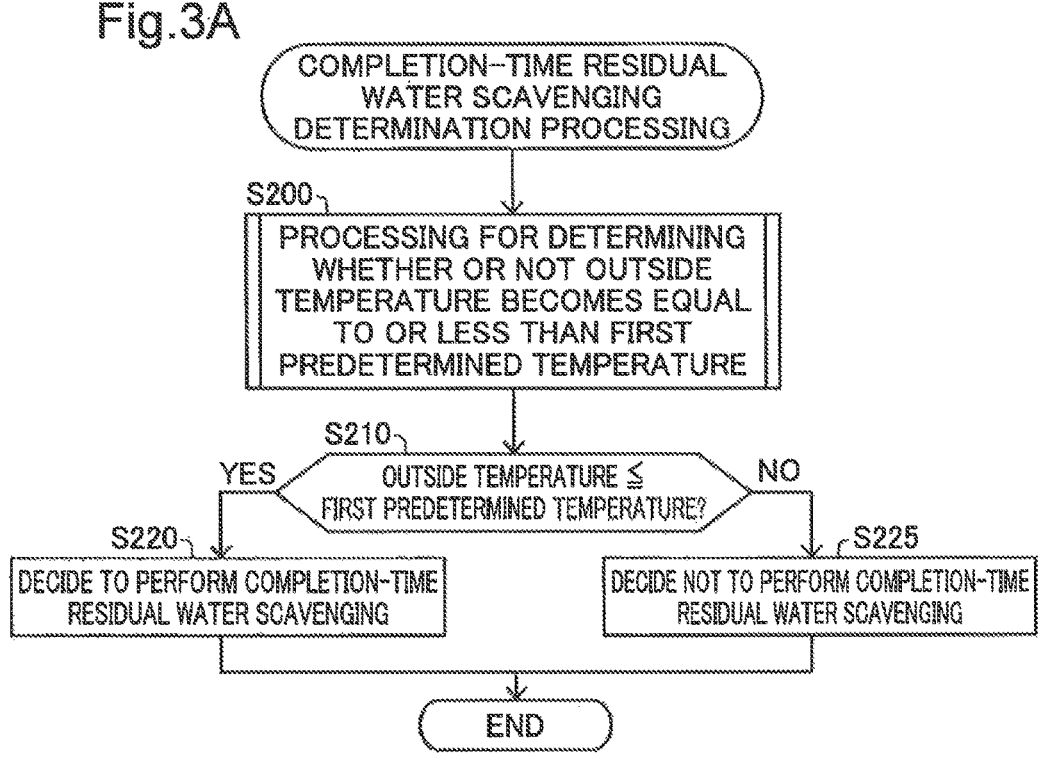
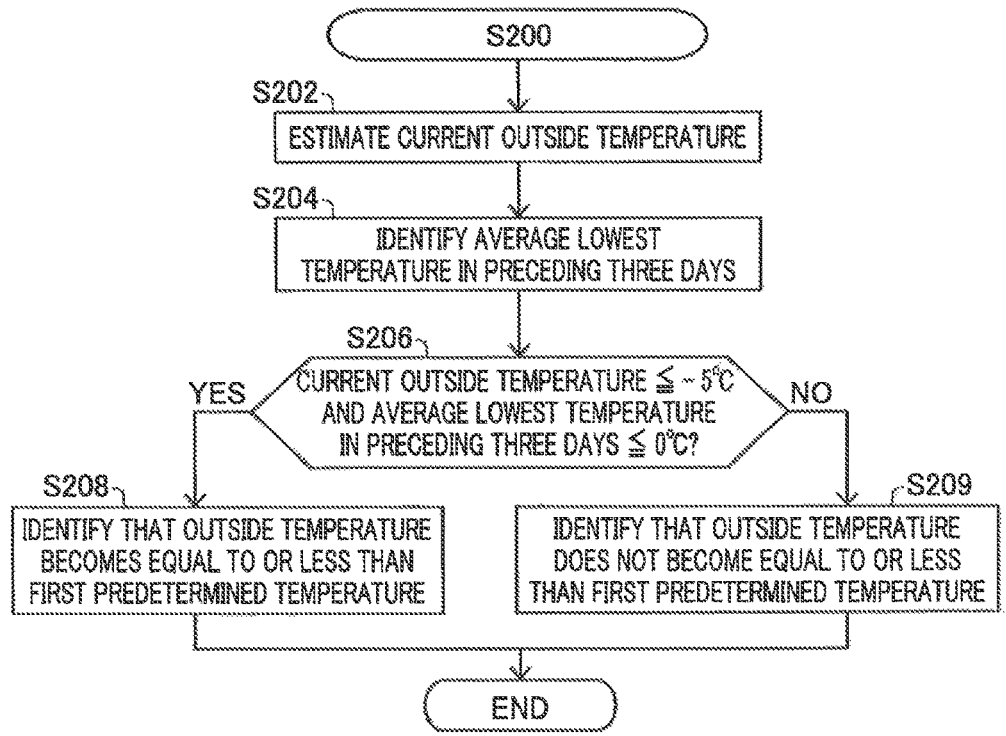

US 10,312,532 B2

RESIDUAL WATER SCAVENGING PROCESSING METHOD IN FUEL CELL SYSTEM AND FUEL CELL SYSTEM

CROSS-REFERENCE TO RELATED APPLICATIONS

This application claims priority based on Japanese Patent Application No. 2014-227017 filed on Nov. 7, 2014 the entire disclosure of which is hereby incorporated by reference.

BACKGROUND

Field

The present invention relates to residual water scavenging processing in a fuel cell system.

Related Art

When the outside temperature is lowered below freezing point after the stop of an operation of a fuel cell system, in the interior of a unit cell forming a fuel cell (cell stack), a reaction gas flow path formed within the fuel cell, an external piping and the like, water may be frozen. When water is frozen in the fine pores of a catalyst layer and a gas diffusion layer within a unit cell, at the time of the subsequent startup of the fuel cell system, the gas diffusion property is lowered to reduce the power generation performance. When in a valve provided in the reaction gas flow path, water is frozen, the opening and closing of the valve is inhibited, and the distribution of a reaction gas and an off-gas is inhibited. Hence, a method has been proposed in which after the stop of a fuel cell system, the temperature of a fuel cell and the outside temperature are measured, and when these temperatures become equal to or less than a predetermined temperature, residual water scavenging processing is performed to discharge water within the fuel cell system. JP2010-198786A discloses a method in which when the ignition of a vehicle mounting the fuel cell system is off, and the temperature of a fuel cell is equal to or less than a predetermined temperature, residual water scavenging is performed on a fuel gas supply/discharge mechanism and an oxidizer gas supply/discharge mechanism. JP2008-218242A discloses a method in which when the outside temperature is measured during the stop of an operation of a fuel cell, and the outside temperature is equal or less than a predetermined temperature, residual water scavenging is performed on a fuel gas supply/discharge mechanism and an oxidizer gas supply/discharge mechanism.

It is assumed that in order to more reliably prevent water from being frozen within a fuel cell system, the two methods described above are combined, residual water scavenging processing is performed according to the temperature of a fuel cell when an ignition is off and the residual water scavenging processing is performed according to the outside temperature during the stop of the fuel cell system. However, in such a configuration, since the residual water scavenging processing is performed a large number of times, power consumption in devices performing the residual water scavenging processing such as an air compressor and the injector of hydrogen gas is disadvantageously increased. Moreover, in a case where the residual water scavenging processing is performed when an ignition is off, even though the ignition is off, vibrations and sound caused by the operation of the air compressor and the like are produced until the completion of the residual water scavenging processing, and thus an uncomfortable feeling is disadvantageously given to a user. Hence, a technology is desired in which it is possible to suppress the freezing of water within a fuel cell system while reducing power consumption necessary for residual water scavenging processing and the of an uncomfortable feeling to the use.

SUMMARY

The present invention is made to solve at least part of the foregoing problem, and can be realized as aspects below.

(1) According to one aspect of the present invention, there is provided a residual water scavenging processing method in a fuel cell system including a fuel gas supply/discharge mechanism and an oxidizer gas supply/discharge mechanism. The residual water scavenging processing method includes: a first prediction step of predicting, while the fuel cell system is operated, whether or not an outside temperature of the fuel cell system becomes equal to or less than a first predetermined temperature; a step of performing, when in the first prediction step, it is predicted that the outside temperature becomes equal to or less than the first predetermined temperature, residual water scavenging processing on only the oxidizer gas supply/discharge mechanism among the fuel gas supply/discharge mechanism and the oxidizer gas supply/discharge mechanism and thereafter stopping the operation of the fuel cell system; a second prediction step of predicting, of stop of the operation of the fuel cell system, whether or not a temperature of a predetermined component included in the fuel cell system becomes equal to or less than a second predetermined temperature; and a step of performing the residual water scavenging processing on the fuel gas supply/discharge mechanism when in the second prediction step, it is predicted that the temperature of the predetermined component becomes equal to or less than the second predetermined temperature.

In the residual water scavenging processing method of this aspect, since before the stop of the operation of the fuel cell system, the residual water scavenging processing is performed on only the oxidizer gas supply/discharge mechanism among the fuel gas supply/discharge mechanism and the oxidizer gas supply/discharge mechanism but the residual water scavenging processing is not performed on the fuel gas supply/discharge mechanism, as compared with the configuration in which the residual water scavenging processing is also performed on the fuel gas supply/discharge mechanism, it is possible to reduce power consumption for the residual water scavenging processing. Since it is possible to reduce the processing time, it is possible to reduce an uncomfortable feeling given to a user. Since before the stop of the operation of the fuel cell system, the residual water scavenging processing is performed on the oxidizer gas supply/discharge mechanism, as compared with the configuration in which the residual water scavenging processing is performed after the stop of the operation, it is possible to perform the scavenging on the oxidizer gas supply/discharge mechanism under an environment of a higher temperature. Hence, it is possible to discharge water within the cathode of the fuel cell as water vapor, and thus it is possible to more reliably discharge the water within the cathode. When it is predicted that after the stop of the operation of the fuel cell system, the temperature of the predetermined component becomes equal to or less than the second predetermined value, since the residual water scavenging processing is performed on the fuel gas supply/discharge mechanism, as compared with conditions before the stop of the operation, it is possible to perform the scavenging on the oxidizer gas supply/discharge mechanism under an environment of a lower temperature. Hence, the scavenging can be performed in a state where a larger amount of water vapor within the atmosphere of the fuel gas supply/discharge mechanism is condensed, and thus it is possible to discharge a larger amount of water.

(2) The residual water scavenging processing method of the above aspect may further include a step of storing, in a storage device included in the fuel cell system, whether or not the residual water scavenging processing has been performed on the oxidizer gas supply/discharge mechanism, and the step of performing the residual water scavenging processing on the fuel gas supply/discharge mechanism may include: a step of performing the residual water scavenging processing on the fuel gas supply/discharge mechanism but failing to perform the residual water scavenging processing on the oxidizer gas supply/discharge mechanism when in the second prediction step, it is predicted that the temperature of the predetermined component becomes equal to or less than the second predetermined temperature and when before the stop of the operation of the fuel cell system, the residual water scavenging processing is performed on the oxidizer gas supply/discharge mechanism; and a step of performing the residual water scavenging processing on the fuel gas supply/discharge mechanism and the oxidizer gas supply/discharge mechanism when in the second prediction step, it is predicted that the temperature of the predetermined component becomes equal to or less than the second predetermined temperature and when before the stop of the operation of the fuel cell system, the residual water scavenging processing is not performed on the oxidizer gas supply/discharge mechanism. In the scavenging method of this aspect, when before the stop of the operation of the fuel cell system, the residual water scavenging processing is performed on the oxidizer gas supply/discharge mechanism, even if it is predicted that the temperature of the predetermined component becomes equal to or less than the second predetermined temperature, the residual water scavenging processing is not performed. Hence, even when before the stop of the operation of the fuel cell system, the residual water scavenging processing is performed on the oxidizer gas supply/discharge mechanism, and it is predicted that the temperature of the predetermined component becomes equal to or less than the second predetermined temperature, as compared with the configuration in which the residual water scavenging processing is performed on the oxidizer gas supply/discharge mechanism, it is possible to reduce the power consumption necessary for the residual water scavenging processing. Moreover, it is possible to reduce the degradation of the fuel cell caused by the residual water scavenging processing on the oxidizer gas supply/discharge mechanism after the stop of the operation.

(3) in the residual water scavenging processing method of the above aspect, the first predetermined temperature may be equal to or less than 0 degrees Celsius. In the residual water scavenging processing method of this aspect, since the first predetermined temperature is equal to or less than 0 degrees Celsius, when it is highly likely that the temperature of the fuel cell system becomes equal to or less than 0 degrees Celsius, and it is highly likely that in the fuel cell system, water is frozen, it is possible to perform the residual water scavenging processing on the oxidizer gas supply/discharge mechanism. Hence, in the fuel cell system, the residual water scavenging processing under temperature conditions (for example, conditions in which the temperature is higher than 0 degrees Celsius) in which water is not frozen can be reduced, and thus it is possible to reduce the power consumption.

(4) In the residual water scavenging processing method of the above aspect, the second predetermined temperature may be 0 degrees Celsius. In the residual water scavenging processing method of this aspect, when the temperature of the predetermined component included in the fuel cell system is equal to or less than 0 degrees Celsius, that is, when it is very highly likely that the temperature of the fuel cell system is equal to or less than 0 degrees Celsius, it is possible to perform the residual water scavenging processing on the fuel gas supply/discharge mechanism. Hence, it is possible to more reliably reduce the residual water scavenging processing under temperature conditions in which water is not frozen in the fuel cell system.

(5) In the residual water scavenging processing method of the above aspect, the predetermined component may be at least one of a valve provided so as to discharge water in the fuel gas supply/discharge mechanism and a valve provided so as to discharge water in the oxidizer gas supply/discharge mechanism. Since the valve provided so as to discharge water in the fuel gas supply/discharge mechanism and the valve provided so as to discharge water in the oxidizer gas supply/discharge mechanism discharge water by utilizing gravity, in general, the valves are arranged in a position which is vertically downward of the fuel cell system and which is closer to the outside. Hence, these valves are more likely to be affected by the outside temperature, and the temperature thereof is most easily lowered under a low temperature environment. Therefore, when the temperature of at least one of these valves is equal to or less than the second predetermined temperature, the residual water scavenging processing is performed, and thus it is possible to perform the residual water scavenging processing before the temperature of the individual constituent elements of the fuel cell system becomes equal to or less than the second predetermined temperature.

The present invention can also be realized in various aspects. For example, the present invention can be realized in the fuel cell system, a fuel cell automobile on which the fuel cell system is mounted, a program for realizing the residual water scavenging processing in the fuel cell system, a receding medium in which such program is recorded, and the like.

BRIEF DESCRIPTION OF DRAWINGS

FIG. 3A is a flowchart showing the procedure of completion-time residual water scavenging determination processing in the present embodiment;

FIG. 3B is a flowchart showing the detailed procedure of processing in step S200 shown in FIG. 3A.

DESCRIPTION OF EMBODIMENTS

A. Embodiment

Figure 1:
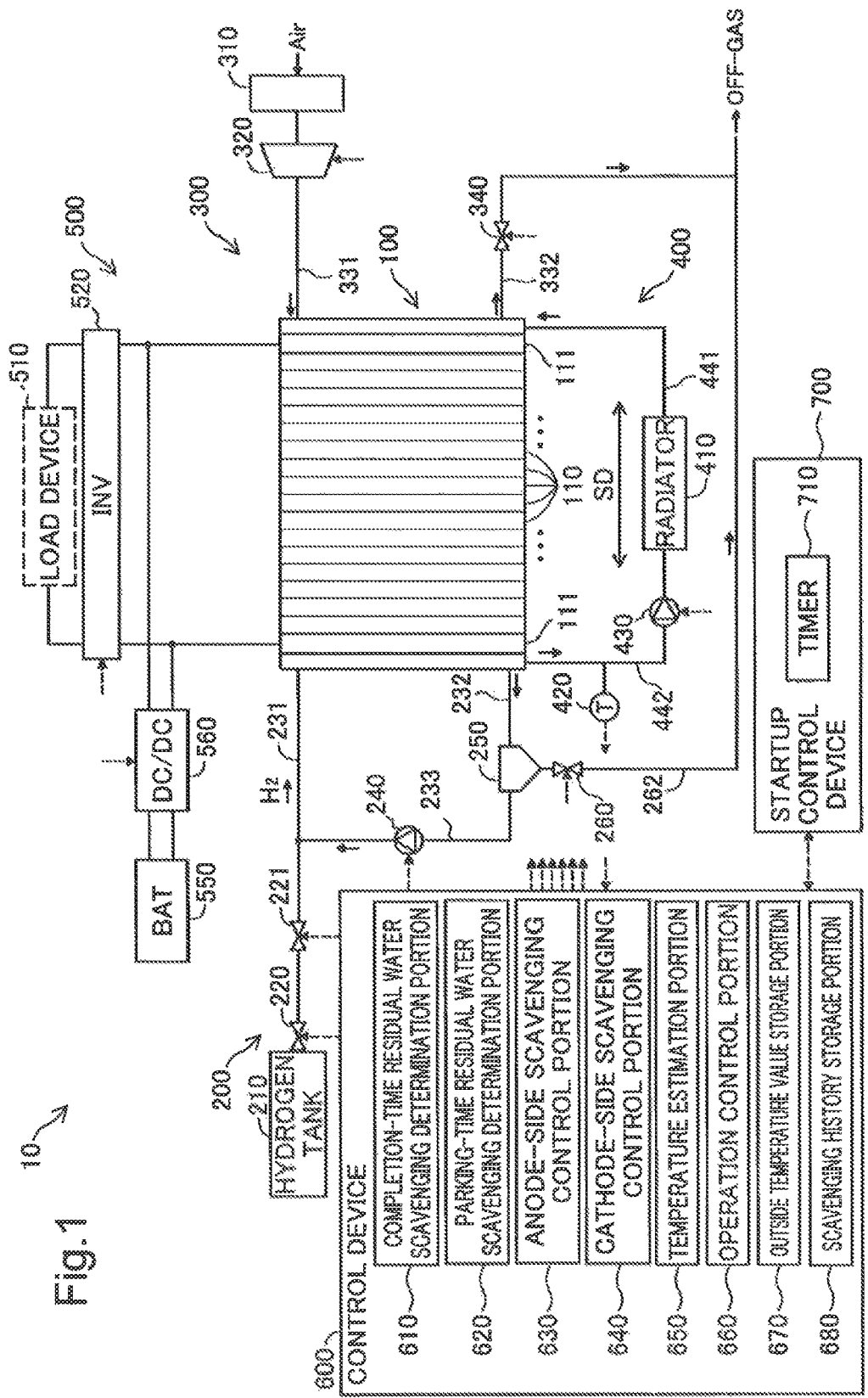
FIG. 1 is a block diagram showing a schematic configuration of a fuel cell system to which a residual water scavenging processing method according to an embodiment of the present invention is applied.

A1. System Configuration:

FIG. 1 is a block diagram showing a schematic configuration of a fuel cell system to which a residual water scavenging processing method according to an embodiment of the present invention is applied. The fuel cell system 10 of the present embodiment is used to be mounted on a fuel cell automobile as a system for supplying power for driving. The fuel cell system 10 includes a fuel cell 100, a fuel gas supply/discharge mechanism 200 also called a fuel gas supply/discharge system, an oxidizer gas supply/discharge mechanism 300 also called an oxidizer gas supply/discharge system, a fuel cell circulation cooling mechanism 400 also called a fuel cell circulation cooling system, a power charging/discharging mechanism 500 also called a power charging/discharging system, a control device 600 and a startup control device 700.

The fuel cell 100 is a so-called solid polymer-type fuel cell, and includes a cell stack formed with a plurality of unit cells 110 stacked in layers along a stacking direction SD, and a pair of current collector plates 111 that are arranged at both ends of the cell stack to function as an overall electrode. Each unit cell 110 generates power by the electrochemical reaction of hydrogen serving as a fuel gas supplied to an anode-side catalyst electrode layer provided to sandwich a solid polymer electrolyte membrane and oxygen included in air serving as an oxidizer gas supplied to a cathode-side catalyst electrode layer. The catalyst electrode layer contains carbon particles carrying a catalyst, for example, platinum (Pt) and an electrolyte. On the outsides of the catalyst electrode layers at both electrode sides of the unit cells 110, gas diffusion layers formed with a porous member are arranged. As the porous member, for example, a carbon porous member such as carbon paper or carbon cloth or a metal porous member such as a metal mesh or a foam metal is used. Within the fuel cell 100, manifolds (not shown) for distributing the fuel gas, the oxidizer gas and a cooling medium are formed along the stacking direction SD.

The fuel gas supply/discharge mechanism 200 supplies the fuel gas to the fuel cell 100 and discharges an anode-side off-gas from the fuel cell 100. The fuel gas supply/discharge mechanism 200 includes a hydrogen tank 210, an interruption valve 220, an injector 221, a gas-liquid separator 250, a circulation pump 240, a purge valve 260, a fuel gas supply path 231, a first fuel gas discharge path 232, a fuel gas circulation path 233 and a second fuel gas discharge path 262.

The hydrogen tank 210 stores high-pressure hydrogen, and supplies hydrogen gas serving as the fuel gas through the fuel gas supply path 231 to the fuel cell 100. The interruption valve 220 is arranged in the vicinity of the supply port of the fuel gas in the hydrogen tank 210, and switches the supply and stop of the hydrogen gas from the hydrogen tank 210. The injector 221 is arranged in the fuel gas supply path 231, and adjusts the supplied amount and the pressure of the hydrogen gas to the fuel cell 100. The gas-liquid separator 250 is arranged in the first fuel gas discharge path 232, separates water contained in the anode-side off-gas discharged from the fuel cell 100 to discharge it to the second fuel gas discharge path 262 and discharges, to the fuel gas circulation path 233, the fuel gas which is a gas obtained by separating the water. The circulation pump 240 is arranged in the fuel gas circulation path 233, and supplies the fuel gas discharged from the gas-liquid separator 250 to the fuel gas supply path 231. The purge valve 260 is arranged in the second fuel gas discharge path 262, and opens the valve to allow the water separated by the gas-liquid separator 250 to be discharged into the atmosphere. In the present embodiment, the opening and closing of the purge valve 260 is performed at predetermined intervals while the fuel cat system 10 is normally operated. The purge valve 260 is kept opened while residual water scavenging processing which will be described later is performed. The gas-liquid separator 250 communicates with the fuel cell 100 through the first fuel gas discharge path 232, and when the purge valve 260 is opened, the purge valve 260 communicates with the atmosphere through the second fuel gas discharge path 262. Since the pressure within the fuel cell 100 is higher than the atmosphere, when the purge valve 260 is opened, the water stored within the gas-liquid separator 250 is discharged to the second fuel gas discharge path 262 by the pressure difference between the fuel cell 100 and the atmosphere. The processing in which as described above, the purge valve 260 is opened to release the pressure within the gas-liquid separator 250 and thereby discharges the water stored within the gas-liquid separator 250 is referred to as "normal water discharge processing" in the following description. In the normal water discharge processing, since an air compressor 320, the circulation pump 240 and the like are not driven, as compared with the residual water scavenging processing which will be described later, power consumption, that is, consumption energy is very small.

The present embodiment, the purge valve 260 described above is arranged most vertically downward among the individual constituent elements of the fuel cell system 10 other than the second fuel gas discharge path 262 and an oxidizer gas discharge path 332. This is because of the following reasons. Specifically, in order to collect, with the gas-liquid separator 250, a larger amount of water present on the anode side of the fuel cell 100, the gas-liquid separator 250 is arranged on the vertically downward side in the fuel cell system 10, and furthermore, in order to rapidly discharge the water stored in the gas-liquid separator 250 by utilizing gravity, the purge valve 260 is arranged vertically downward of the gas-liquid separator 250; in order to satisfy these requirements, the purge valve 260 is arranged most vertically downward among the constituent elements other than the second fuel gas discharge path 262 and the oxidizer gas discharge path 332. As described above, in the fuel cell system 10, the purge valve 260 is arranged in a relatively vertically downward position, and is affected by the outside temperature as compared with the constituent elements other than the second fuel gas discharge path 262 and the oxidizer gas discharge path 332.

The oxidizer gas supply/discharge mechanism 300 supplies the oxidizer gas to the fuel cell 100 and discharges a cathode-side off-gas from the fuel cell 100. The oxidizer gas supply/discharge mechanism 300 includes an air cleaner 310, the air compressor 320, a back pressure valve 340, an oxidizer gas supply path 331 and an oxidizer gas discharge path 332. The air cleaner 310 removes foreign substances such as dust in the air with a filter provided therewithin, and supplies the air after the removal of the foreign substances to the air compressor 320. The air compressor 320 compresses the air supplied from the air cleaner 310 and feeds out it to the oxidizer gas supply path 331. The back pressure valve 340 is arranged in the oxidizer gas discharge path 332, and adjusts a so-called back pressure that is a pressure on the cathode discharge side in the fuel cell 100. The oxidizer gas discharge path 332 is connected to the second fuel gas discharge path 262 described above, and the water and the cathode-side off-gas discharged through the oxidizer gas discharge path 332 are discharged into the atmosphere together with the water and the anode-side off-gas discharged through the second fuel gas discharge path 262.

The fuel cell circulation cooling mechanism 400 circulates the cooling medium through the fuel cell 100 to adjust the temperature of the fuel cell 100. The fuel cell circulation cooling mechanism 400 includes a radiator 410, a cooling medium discharge path 442, a cooling medium supply path 441, a circulation pump 430 and a temperature sensor 420. The radiator 410 is connected to the cooling medium discharge path 442 and the cooling medium supply path 441, and cools the cooling medium flows in from the cooling medium discharge path 442 such as by blowing from an unillustrated electric fan and thereafter discharges it to the cooling medium supply path 441. The cooling medium discharge path 442 is connected to a cooling medium discharge manifold within the fuel cell 100, and the cooling medium supply path 441 is connected to a cooling medium supply manifold within the fuel cell 100. Hence, the cooling medium discharge path 442, the radiator 410, the cooling medium supply path 441 and the manifold within the fuel cell 100 form the circulation path of the cooling medium. The temperature sensor 420 is arranged in the vicinity of the fuel cell 100 in the cooling medium discharge path 442, measures the temperature of the cooling medium discharged from the fuel cell 100 and outputs a signal indicating the temperature value. In the present embodiment, the temperature measured by the temperature sensor 420 is dealt with as the temperature of the fuel cell 100. In the present embodiment, water is used as the cooling medium. However, instead of water, unfreezable water such as ethylene glycol or an arbitrary medium such as air which can perform heat exchange may be used as the cooling medium.

The power charging/discharging mechanism 500 supplies, to a load device 510, power output from the fuel cell 100 or a battery 550. In the present embodiment, the load device 510 refers to a vehicle driving motor and various types of auxiliary machines, and the load device 510 is connected to each of the current collector plates 111 on the positive side and the negative side of the fuel cell 100. The power charging/discharging mechanism 500 includes an inverter 520, a DC-DC converter 560 and the battery 550. The inverter 520 is connected parallel to the fuel cell 100 and the battery 550, converts a direct current supplied from the fuel cell 100 or the battery 550 into an alternating current and supplies it to the load device 510. The DC-DC converter 560 steps up the output voltage of the battery 550 to supply it to the inverter 520, and steps down the output voltage to supply it to the battery 550 so that the surplus generated power of the fuel cell 100 is stored.

The control device 600 is electrically connected to the interruption valve 220, the injector 221, the circulation pump 240, the purge valve 260, the air compressor 320, the back pressure valve 340, the circulation pump 430, the inverter 520 and the DC-DC converter 560 described above, and controls these components. The control device 600 is electrically connected to the temperature sensor 420, and receives a signal indicating the temperature value output from the temperature sensor 420. The control device 600 is formed with an unillustrated microcomputer including a Central Processing Unit (Central Processing Unit), a Read Only Memory (ROM) and a Random Access Memory (RAM), the CPU executes control programs stored in the ROM and thus the control device 600 functions as a completion-time residual water scavenging determination portion 610, a parking-time residual water scavenging determination portion 620, an anode-side scavenging control portion 630, a cathode-side scavenging control portion 640, a temperature estimation portion 650 and an operation control portion 660.

In the residual water scavenging processing which will be described later, the completion-time residual water scavenging determination portion 610 makes a determination as to whether or not completion-time residual water scavenging is performed (hereinafter referred to as a "completion-time residual water scavenging determination"). The completion-time residual water scavenging means processing in which when the operation of the fuel cell system 10 is stopped, only the scavenging on the cathode side is performed to discharge the water present on the cathode side. Here, the "cathode side" includes the cathode-side constituent elements (the cathode side of the electrolyte membrane, the cathode-side catalyst layer and the cathode-side gas diffusion layer) in each unit cell 110, the oxidizer gas supply manifold within the fuel cell 100, the oxidizer gas discharge manifold within the fuel cell 100, the oxidizer gas supply path 331 and the oxidizer gas discharge path 332. The "water present on the cathode side" includes water stored within the fine pores formed in the cathode-side catalyst layer and the cathode-side gas diffusion layer in each unit cell 110, water stored in the oxidizer gas supply manifold and the oxidizer gas discharge manifold within the fuel cell 100, water stored within the oxidizer gas supply path 331, water stored within the oxidizer gas discharge path 332 and water stored in the back pressure valve 340. The water described above includes generated water produced by the electrochemical reaction on the cathode side of each unit cell 110 and the liquid water produced by the condensation of water vapor contained within an atmosphere on the cathode side. The "residual water scavenging processing" means processing in which in order to prevent freezing, the residual water in the gas supply/discharge mechanism is discharged. Specifically, on the cathode side, the residual water scavenging processing is performed by opening the hack pressure valve 340 and supplying a predetermined amount of air to the fuel cell 100 with the air compressor 320. As described above, in the residual water scavenging processing, since the air compressor 320 is driven, as compared with normal discharge processing, the power consumption (consumption energy) is increased. In the residual water scavenging processing, the scavenging on the anode side is also performed. The scavenging on the anode side will be described later.

In the residual water scavenging processing which will be described later, the parking-time residual water scavenging determination portion 620 makes a determination as to whether or not parking-time residual water scavenging is performed (hereinafter referred to as a "parking-time residual water scavenging determination"). The parking-time residual water scavenging means processing in which after the stop of the operation of the fuel cell system 10, only on the anode side or both on the anode side and the cathode side, the scavenging is performed to discharge the water present only on the anode side or the water present both on the anode side and the cathode side. The "cathode side" and the "water present on the cathode side" are the same as the "cathode side" and the "water present on the cathode side" in the completion-time residual water scavenging described above, and thus their detailed description will be omitted. The "anode side" described above includes the anode-side constituent elements (the anode side of the electrolyte membrane, the anode-side catalyst layer and the anode-side gas diffusion layer) in each unit cell 110, the oxidizer gas supply manifold within the fuel cell 100, the oxidizer gas discharge manifold within the fuel cell 100, the fuel gas supply path 231, the first fuel gas discharge path 232, the gas-liquid separator 250, the purge valve 260 and the second fuel gas discharge path 262. The "water present on the anode side" includes water stored within the fine pores formed in the anode-side catalyst layer and the anode-side gas diffusion layer in each unit cell 110, water stored in the fuel gas supply manifold and the fuel gas discharge manifold within the fuel cell 100, water stored within the fuel gas supply path 231, water stored within the first fuel gas discharge path 232, water stored in the gas-liquid separator 250, water stored in the purge valve 260 and water stored in the second fuel gas discharge path 262. The water described above includes water (reverse diffusion water) passing through the electrolyte membrane from the cathode side of each unit cell 110 and the liquid water produced by the condensation of water vapor contained within the atmosphere. The scavenging on the anode side is performed by opening the purge valve 260 and supplying a predetermined amount of hydrogen gas to the fuel cell 100 with the injector 221 and the circulation pump 240. As described above, in the residual water scavenging processing, since the injector 221 and the circulation pump 240 are driven, as compared with normal discharge processing, the power consumption, that is, the consumption energy is increased.

The anode-side scavenging control portion 630 adjusts the number of revolutions of the air compressor 320, the opening of the back pressure valve 340 and the like to control the scavenging on the anode side. The cathode-side scavenging control portion 640 adjusts a flow rate in the injector 221, a flow rate in the circulation pump 240 and the opening of the purge valve 260 to control the scavenging on the cathode side.

The temperature estimation portion 650 periodically estimates the outside temperature. In the present embodiment, the outside temperature means the temperature of the outside of a fuel cell automobile on which the fuel cell system 10 is mounted. In the present embodiment, a map (hereinafter referred to as an "outside temperature map") which associates the fuel cell temperature, the degree of variation in the fuel cell temperature and the outside temperature with each other is previously stored in the ROM of the control device 600, the outside temperature map is referenced to and thus the outside temperature is estimated based on the fuel cell temperature, that is, the temperature indicated by the signal from the temperature sensor 420. The change in the temperature of the fuel cell 100 correlates with the outside temperature. For example, when the outside temperature is very low, the change in the temperature (the degree of the decrease in the temperature) of the fuel cell 100 is very increased. Hence, in the present embodiment, the relationship between the current fuel cell temperature, the change in the fuel cell temperature, that is, the degree of change with time and the outside temperature is previously determined by tests or the like, and thus the outside temperature map is produced and is stored in the ROM of the control device 600.

The temperature estimation portion 650 also estimates, in scavenging determination processing which will be described later, the outside temperature and the temperature of the purge valve 260. Since a method of estimating the outside temperature performed in the scavenging determination processing is the same as the above-described method of estimating the outside temperature performed periodically, the detailed description thereof will be omitted. In the present embodiment, a map (hereinafter referred to as a "purge valve temperature map") which associates the fuel cell temperature, the outside temperature and the temperature of the purge valve 260 with each other is previously stored in the ROM of the control device 600, the purge valve temperature map is referenced and thus the temperature of the purge valve 260 is estimated based on the fuel cell temperature and the estimated outside temperature. The purge valve 260 communicates with the fuel cell 100 through the gas-liquid separator 250 and the first fuel gas discharge path 232, and communicates with the atmosphere through the second fuel gas discharge path 262. Hence, the temperature of the purge valve 260 correlates with the temperature of the fuel cell 100 and the outside temperature. Therefore, in the present embodiment, the relationship between the current fuel cell temperature, the outside temperature and the temperature of the purge valve 260 is previously determined by tests or the like, and thus the purge valve temperature map is produced and is stored in the ROM of the control device 600.

The operation control portion 660 controls the function portions 610 to 650 described above, also controls the drive and stop of the constituent elements, such as the air compressor 320 and the injector 221, electrically connected to the control device 600 and thereby controls the operation of the fuel cell system 10 including the power generation of the fuel cell 100.

In the unillustrated ROM of the control device 600, the control programs, the outside temperature map and the purge valve temperature map described above are stored, and an outside temperature value storage portion 670 and a scavenging history storage portion 680 are provided. The outside temperature value storage portion 670 stores the values of the outside temperatures estimated periodically by the temperature estimation portion 650. The scavenging history storage portion 680 stores the history of whether or not the completion-time residual water scavenging is performed.

The startup control device 700 controls the feeding of power to the control device 600 to switch the turning on and off of the power source of the control device 600. The startup control device 700 includes a timer 710, and when the timer expires, power is fed to the control device 600, and thus the control device 600 in the power-off state is brought into the power-on state with predetermined timing. The startup of the timer 710 is performed by the operation control portion 660 in the scavenging processing which will be described later. In the present embodiment, the startup control device 700 is formed with an Application Specific Integrated Circuit (ASIC). Instead of an ASIC, as with the control device 600, the startup control device 700 may be formed with a CPU, a RAM and a ROM.

The control device 600 is electrically connected to an unillustrated. Electronic Circuit Unit (ECU) of the fuel cell automobile and exchanges signals with the ECU. For example, the control device 600 receives a signal indicating that the ignition of the fuel cell automobile is on and a signal indicating that the ignition is off.

The fuel cell system 10 having the configuration described above performs the residual water scavenging processing which will be described later, and thereby reduces, while reducing the power consumption necessary for the residual water scavenging, the uncomfortable feeling of the user and suppressing the freezing of water within the fuel cell system.

The completion-time residual water scavenging determination portion 610 described above corresponds to a first prediction portion in claims. The cathode-side scavenging control portion 640, the air compressor 320 and the hack pressure valve 340 correspond to a cathode-side scavenging processing portion in claims. The parking-time residual water scavenging determination portion 620 corresponds to a second prediction portion in claims. The hydrogen tank 210, the interruption valve 220, the injector 221, the circulation pump 240 and the purge valve 260 correspond to an anode-side scavenging processing portion in claims. The ROM of the control device 600 corresponds to a storage device in claims.

Figure 2:
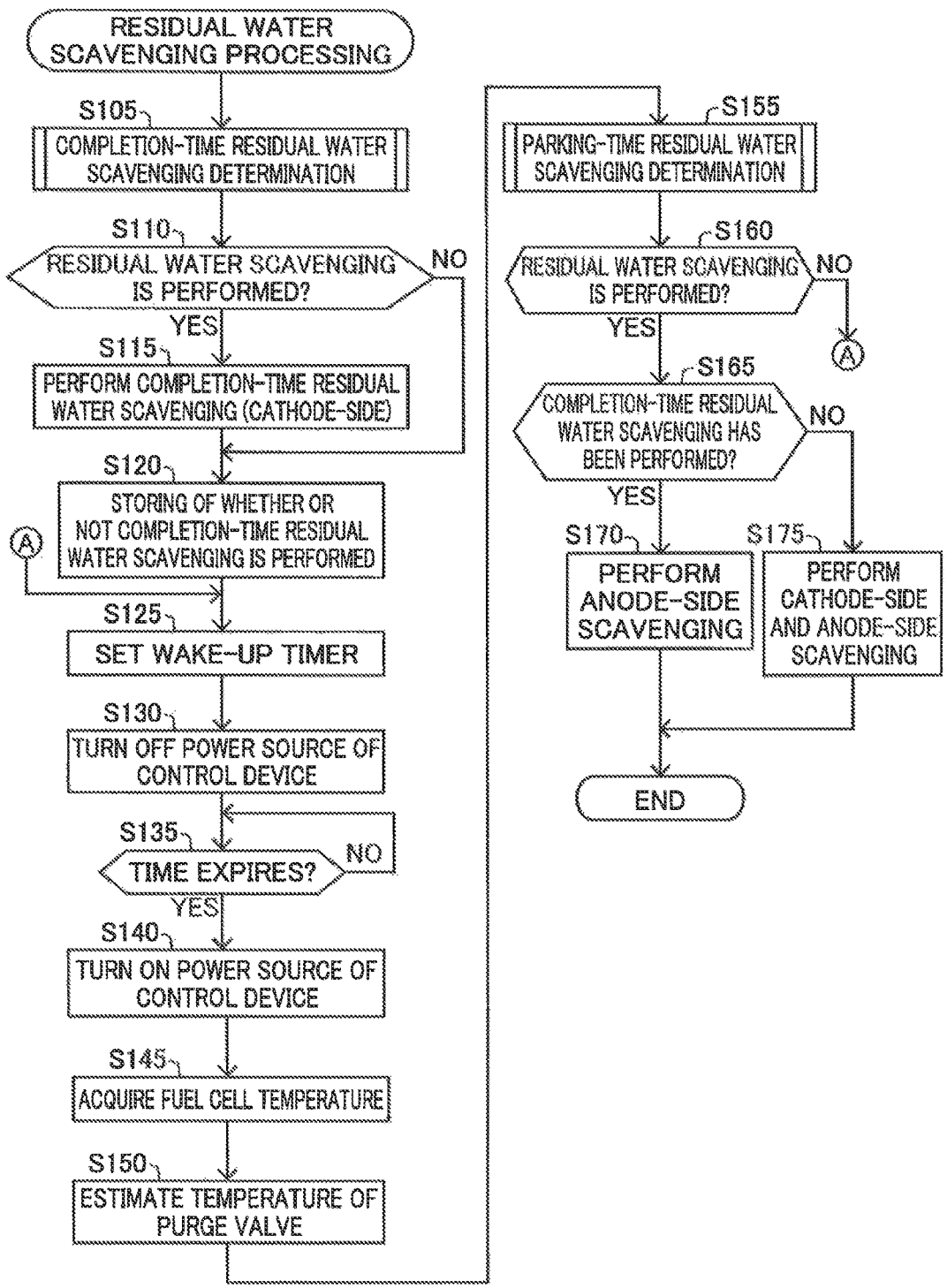
FIG. 2 is a flowchart showing the procedure of residual water scavenging processing performed in the fuel cell system.

A2. Residual Water Scavenging Processing:

FIG. 2 is a flowchart showing the procedure of the residual water scavenging processing performed in the fuel cell system 10. In the fuel cell system 10, the signal indicating that the ignition is off is received from the unillustrated ECU, the residual water scavenging processing is performed.

The completion-time residual water scavenging determination portion 610 performs completion-time residual water scavenging determination processing (step S105). FIG. 3A is a flowchart showing the procedure of the completion-time residual water scavenging determination processing in the present embodiment. Firstly, processing for determining whether or not the outside temperature is equal to or less than a first predetermined temperature is performed (step S200). In the present embodiment, the first predetermined temperature is set at 0 degrees Celsius. Instead of 0 degrees Celsius, the first predetermined temperature may be set at an arbitrary temperature lower than 0 degrees Celsius. FIG. 3B is a flowchart showing the detailed procedure of processing in step S200 shown in FIG. 3A. As shown in FIG. 3B, the temperature estimation portion 650 estimates the current outside temperature (step S202). The completion-time residual water scavenging determination portion 610 identifies the average lowest temperature in the preceding three days (step S204) based on the outside temperature values stored in the outside temperature value storage portion 670. In other words, the lowest value of the outside temperature in each of the preceding three days is identified, and the average value thereof is determined.

The completion-time residual water scavenging determination portion 610 determines whether the current outside temperature estimated in step S202 is equal to or less than −5 degrees Celsius and whether the average lowest temperature identified in step S204 is equal to or less than 0 degrees Celsius (step S206). When the current outside temperature is equal to or less than −5 degrees Celsius, and the average lowest temperature in the preceding three days is equal to or less than 0 degrees Celsius, it is highly likely that the lowest temperature (the outside temperature) on the day when the residual water scavenging processing is performed falls below 0 degrees Celsius.

When it is determined that the current outside temperature is equal to or less than −5 degrees Celsius, or that the average lowest temperature in the preceding three days is equal to or less than 0 degrees Celsius (step S206: YES), the completion-time residual water scavenging determination portion 610 identifies that the outside temperature becomes equal to or less than the first predetermined temperature (step S208). On the other hand, when it is determined that the current outside temperature is not equal to or less than −5 degrees Celsius, or that the average lowest temperature in the preceding three days is not equal to or less than 0 degrees Celsius (step S206: NO), the completion-time residual water scavenging determination portion 610 identifies that the outside temperature does not become equal to or less than the first predetermined temperature (step S209). As shown in FIG. 3A, after the completion of step S200, the completion-time residual water scavenging determination portion 610 determines, as a result of step S200, whether it is identified that the outside temperature becomes equal to or less than the first predetermined temperature (step S210). When it is determined that it is identified that the outside temperature becomes equal to or less than the first predetermined temperature (step S210: YES), the completion-time residual water scavenging determination portion 610 decides that the completion-time residual water scavenging is performed (step S220). On the other hand, when it is not determined that the outside temperature is identified to be equal to or less than the first predetermined temperature, that is, when it is determined that the outside temperature is not identified to be equal to or less than the first predetermined temperature, the completion-time residual water scavenging determination portion 610 decides that the completion-time residual water scavenging is not performed (step S225).

As shown in FIG. 2, the cathode-side scavenging control portion 640 determines whether it is decided that the completion-time residual water scavenging is performed (step S110) as a result of the completion-time residual water scavenging determination processing, and when it is determined that the completion-time residual water scavenging is performed (step S110: YES), the cathode-side scavenging control portion 640 performs the completion-time residual water scavenging, that is, the cathode-side scavenging (step S115). After the completion-time residual water scavenging is performed, the cathode-side scavenging control portion 640 stores information indicating whether or not the completion-time residual water scavenging has been performed in the scavenging history storage portion 680 (step S120). As described above, when step S115 is performed, in step S120, information indicating that the completion-time residual water scavenging has been performed is stored in the scavenging history storage portion 680. On the other hand, when in step S110 described above, it is determined that it is not determined that the completion-time residual water scavenging is performed (step S110: NO), the cathode-side scavenging control portion 640 does not perform the completion-time residual water scavenging, and stores, in the scavenging history storage portion 680, information indicating whether or not the completion-time residual water scavenging has been performed, that is, in this case, information indicating that the completion-time residual water scavenging has not been performed (step S120).

As described above, when the current outside temperature is equal to or less than −5 degrees Celsius, and the average lowest temperature in the preceding three days is equal to or less than 0 degrees Celsius, that is, when it is highly likely that the lowest temperature on the day when the residual water scavenging processing is performed falls below 0 degrees Celsius, the completion-time residual water scavenging is performed to discharge the water on the cathode side. This is because of the following reasons. Since on the cathode side of each unit cell 110, the generated water is produced by the electrochemical reaction, water is easily stored in the fine pores of the catalyst layer and the gas diffusion layer. Here, when the lowest temperature falls below 0 degrees Celsius, during parking, the temperature within the fuel cell 100 is highly likely to become equal to or less than 0 degrees Celsius, with the result that it is highly likely that on the cathode side, the water within the fine pores of the catalyst layer and the gas diffusion layer is frozen to lower the performance. However, it is not easy to discharge the water (the liquid water) within the fine pores of the catalyst layer and the gas diffusion layer only by the force of the oxidizer gas (air) supplied from the air compressor 320. Here, immediately after the start of the scavenging processing, that is, immediately after the ignition is turned off, the temperature of each unit cell 110 is relatively high as in the operation, and thus it is possible to contain, as water vapor, a large amount of water in the atmosphere within each unit cell 110. Hence, the completion-time residual water scavenging is performed, and thus it is possible to discharge, as water vapor, a larger amount of water from the water within the fine pores of the catalyst layer and the gas diffusion layer on the cathode side. The reason why in the completion-time residual water scavenging, the scavenging is not performed on the anode side will be described later.

After the completion of the performance in step S120 described above, the operation control portion 660 controls the startup control device 700 to set a wake-up timer (step S125). As will be described later, in the fuel cell system 10, after the power source of the control device 600 is turned off, the power source of the control device 600 is periodically turned on and off. The wake-up timer means the time measurement of a period, with the timer 710, in which the power source of the control device 600 is turned on after the turning off of the power source, and in step S125, the time measurement of this period is started. In the present embodiment, the period in which the power source of the control device 600 is turned on after the turning off of the power source is set at 1 hour. The period is not limited to 1 hour, and an arbitrary period may be set.

The operation control portion 660 turns off the power source of the control device 600 (step S130). Although not shown in the figure, the operation control portion 660 turns off the power source of devices to be controlled such as the air compressor 320 and the injector 221 before the power source of the control device 600 is turned off. The startup control device 700 waits until the wake-up timer expires (step S135), and when the wake-up timer expires (step S135: YES), the startup control device 700 feeds power to the control device 600 to turn on the power source of the control device 600 (step S140). Here, the power is fed to the temperature sensor 420, the function portion for performing the scavenging on the anode side such as the injector 221 and the circulation pump 240, the function portion for performing the scavenging on the cathode side such as the air compressor 320 and the back pressure valve 340, and the converter 560.

The temperature estimation portion 650 acquires the temperature of the fuel cell system 10 based on a signal received from the temperature sensor 420 (step S145). The temperature estimation portion 650 estimates the temperature of the purge valve 260 (step S150).

Figure 4:
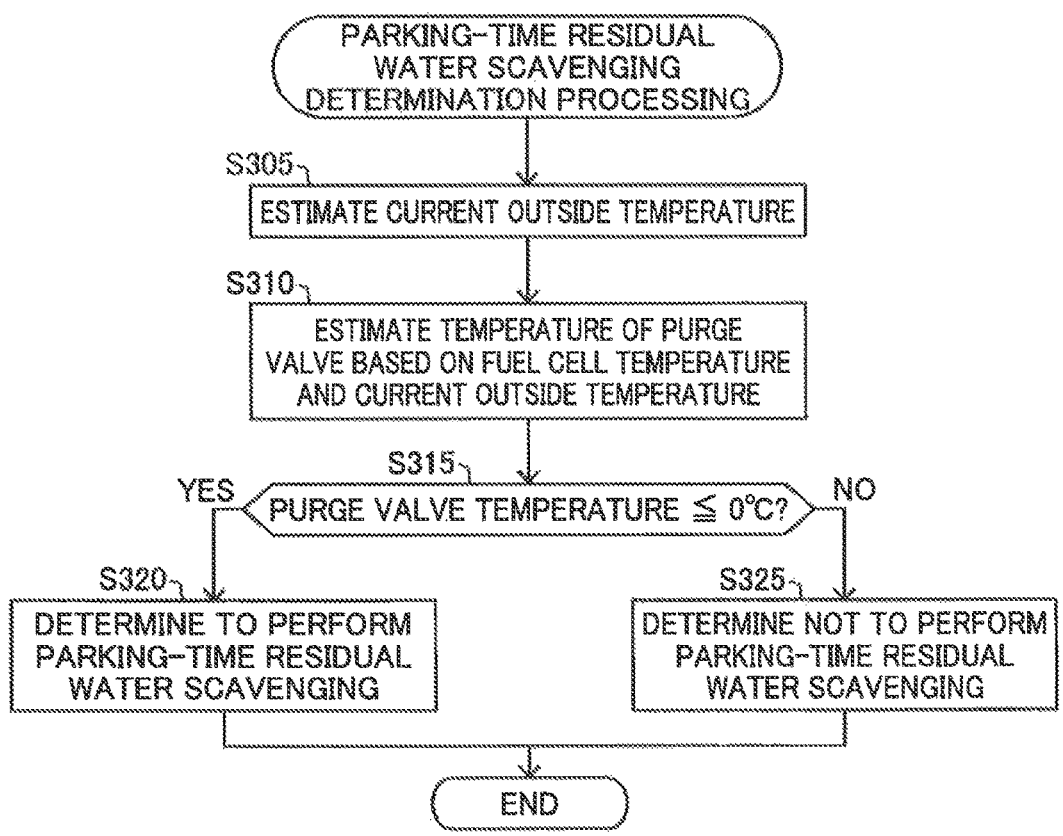
FIG. 4 is a flowchart showing the procedure of parking-time residual water scavenging determination processing in the present embodiment.

The parking-time residual water scavenging determination portion 620 performs parking-time residual water scavenging determination processing (step S155). FIG. 4 is a flowchart showing the procedure of the parking-time residual water scavenging determination processing in the present embodiment. The temperature estimation portion 650 estimates the current outside temperature (step S305). Based on the temperature of the fuel cell 100 acquired in step S145 and the current outside temperature estimated in step S305, the temperature estimation portion 650 references the purge valve temperature map described above to estimate the temperature of the purge valve 260 (step S310). The parking-time residual water scavenging determination portion 620 determines whether or not the temperature of the purge valve 260 estimated in step S310 is equal to or less than 0 degrees Celsius (step S315). When it is determined that the temperature of the purge valve 260 is equal to or less than 0 degrees Celsius (step S315: YES), the parking-time residual water scavenging determination portion 620 decides that the parking-time residual water scavenging is performed (step S320) whereas when it is determined that the temperature of the purge valve 260 is not equal to or less than 0 degrees Celsius (step S315: NO), the parking-time residual water scavenging determination portion 620 decides that the parking-time residual water scavenging is not performed (step S325). The "0 degrees Celsius" which is the reference in step S315 described above corresponds to a second predetermined temperature in claims.

As shown in FIG. 2, each of the anode-side scavenging control portion 630 and the cathode-side scavenging control portion 640 determines, as a result of the parking-time residual water scavenging determination processing, whether or not it is decided that the parking-time residual water scavenging is performed (step S160), and when it is determined that the parking-time residual water scavenging is performed (step S160: YES), the scavenging history stored in the scavenging history storage portion 680 is referenced, and whether or not the completion-time residual water scavenging (step S115) has been performed is determined (step S165). On the other hand, when in step S160 described above, it is determined that the parking-time residual water scavenging is not performed (step S160: NO), the process returns to step S125 described above. Hence, the wake-up timer is set (step S125), and the power source of the control device 600 is turned off again (step S130).

When in step S165 described above, it is determined that the completion-time residual water scavenging has been performed (step S165: YES), the anode-side scavenging control portion 630 performs the scavenging on the anode side (step S170). In this case, the cathode-side scavenging control portion 640 does not perform the scavenging on the cathode side. On the other hand, when it is determined that the completion-time residual water scavenging has not been performed (step S165: NO), the cathode-side scavenging control portion 640 performs the scavenging on the cathode side, and the anode-side scavenging control portion 630 performs the scavenging on the anode side (step S175). After the completion of the performance in step S170 or step S175 described above, the residual water scavenging processing is completed.

The reason why as described above, when the temperature of the purge valve 260 is equal to or less than 0 degrees Celsius, the scavenging on the anode side or the scavenging on the cathode side and the anode side is performed will be described below. The purge valve 260 is more likely to be affected by the outside temperature than the constituent elements of the fuel cell system 10 other than the second fuel gas discharge path 262 and the oxidizer gas discharge path 332. Moreover, since water is more likely to be stored in the purge valve 260, when the outside temperature is lowered, it is highly likely that water is frozen the earliest in the purge valve 260. Hence, when the temperature of the purge valve 260 is estimated to be equal to or less than 0 degrees Celsius, the scavenging is performed, and thus the freezing of water in the individual portions of the fuel cell system 10 is suppressed.

The reason why as described above, when the completion-time residual water scavenging has been performed, as the parking-time residual water scavenging processing, the scavenging the cathode side is not performed is as follows. On the cathode side, a large amount of water (generated water) is present within the fine pores of the catalyst layer and the gas diffusion layer in each unit cell 110, and a large proportion of the water can be removed in the completion-time residual water scavenging. Water that is stored in places other than the interior of the unit cell 110 such as the oxidizer gas discharge path 332 on the cathode side and the back pressure valve 340 can also be discharged by the force of the oxidizer gas supplied in the completion-time residual water scavenging. Hence, when after the power source of the control device 600 is turned off, the temperature of the fuel cell 100 is lowered by a decrease in the outside temperature, it is possible to suppress the freezing of water on the cathode side without performing again the parking-time residual water scavenging. Moreover, the scavenging on the cathode side serving as the parking-time residual water scavenging processing is omitted, and thus power necessary for the scavenging is reduced.

The reason why as described above, the scavenging on the anode side is performed as the parking-time residual water scavenging processing but is not performed as the completion-time residual water scavenging processing is as follows. The amount of water stored in the fine pores of the catalyst layer and the gas diffusion layer on the anode side of each unit cell 110 is very smaller than on the cathode side. Hence, the water stored on the anode side is mostly water stored in the manifold within the fuel cell 100, the first fuel gas discharge path 232, the gas-liquid separator 250, the purge valve 260, the second fuel gas discharge path 262 and the like, and the water described above can be sufficiently discharged by the force of the fuel gas supplied in the scavenging. In other words, the water on the anode side can be sufficiently discharged even when the temperature of the fuel cell system 10 is relatively low. When it is estimated that it is highly likely that the temperature within the fuel cell 100 is equal to or less than 0 degrees Celsius, the temperature of the fuel cell 100 and the temperature of the entire fuel cell system 10 including the fuel cell 100 are not necessarily equal to or less than 0 degrees Celsius. When the temperature of the fuel cell system 10 is not equal to or less than 0 degrees Celsius, it is possible to suppress the freezing of water without performing the scavenging on the anode side. On the other hand, when the temperature of the purge valve 260 is estimated to be equal to or less than 0 degrees Celsius, it is very highly likely that the temperature within the fuel cell system 10 is equal to or less than 0 degrees Celsius. Hence, the scavenging on the anode side is performed as the parking-time residual water scavenging processing which is performed when it is very highly likely that the temperature within the fuel cell system 10 is equal to or less than 0 degrees Celsius, and thus power necessary for the scavenging is reduced. Moreover, since the temperature of the fuel cell system 10 is more lowered in parking than at the time of the start of the scavenging processing, that is, immediately before the stop of the operation of the fuel cell 100, water vapor in an atmosphere is more condensed, and a larger amount of liquid water is present on the anode side. Hence, the scavenging performed in parking makes it possible to discharge a larger amount of water. Therefore, on the anode side, the completion-time residual water scavenging is not performed such that power necessary for the scavenging is reduced, and the scavenging is performed in parking when the effectiveness of the scavenging is high.

On the other hand, on the cathode side, since as described above, it is not possible to discharge water within the fine pores of the catalyst layer and the gas diffusion layer unless the temperature of the fuel cell 100 is relatively high, when as a result of the completion-time residual water scavenging determination, it is determined that it is highly likely that the temperature of the fuel cell 100 is equal to or less than 0 degrees Celsius, even if the scavenging may be useless, the scavenging is performed to reliably suppress the freezing of water.

In the fuel cell system 10 of the embodiment described above, since in the completion-time residual water scavenging processing, among the cathode side and the anode side, the scavenging is performed only on the cathode side and not on the anode side, as compared with the configuration in which the scavenging is performed on the anode side in addition to the cathode side, it is possible to reduce the power consumption for the scavenging. Moreover, since it is possible to reduce the processing time of the completion-time residual water scavenging, it is possible to reduce an uncomfortable feeling given to the user, for example, an uncomfortable feeling caused by vibrations and sound produced in the scavenging even though the ignition is turned off. Moreover, since as the completion-time residual water scavenging processing, the scavenging on the cathode side is performed, as compared with the configuration in which the scavenging on the cathode side is performed in parking, it is possible to more reliably discharge water within the catalyst layer and the gas diffusion layer on the cathode side of each unit cell 110.

Since the scavenging on the anode side is performed when the scavenging determination in parking, that is, the parking-time residual water scavenging determination is performed and the estimated temperature of the purge valve 260 becomes equal to or less than 0 degrees Celsius, it is possible to suppress the freezing of water on the anode side, and as compared with the configuration in which as the completion-time residual water scavenging, the scavenging on the anode side is performed, the scavenging can be performed in a state where the temperature on the anode side is lower. Hence, the scavenging can be performed in a state where a larger amount of water vapor within the atmosphere on the anode side is condensed, and thus it is possible to discharge a larger amount of water.

Since in the completion-time residual water scavenging determination, the threshold value of the outside temperature is set lower than 0 degrees Celsius, when it is highly likely that the temperature within the fuel cell 100 is equal to or less than 0 degrees Celsius, the completion-time residual water scavenging can be performed. Hence, it is possible to suppress the performance of the scavenging even though the temperature within the fuel cell 100 is more than 0 degrees Celsius, and the water within the fuel cell 100 is not frozen, and thus it is possible to reduce the power consumption.

Since as the temperature compared with the threshold value in the parking-time residual water scavenging determination, the temperature of the purge valve 260 which is more likely to be affected by the outside temperature and in which the discharged water is more likely to be stored is used, and the threshold value is set at 0 degrees Celsius, it is possible to perform, before the freezing of water, the scavenging on almost all constituent elements at least on the anode side.

When the completion-time residual water scavenging is performed, since the scavenging on the cathode side is not performed as the parking-time residual water scavenging, as compared with the configuration in which the scavenging on the cathode side is performed as the completion-time residual water scavenging and the scavenging on the cathode side is performed as the parking-time residual wafer scavenging, it is possible to reduce the power consumption. Moreover, it is possible to suppress the degradation of each unit cell 110 caused by a change in the potential on the cathode side through the supply of the oxidizer gas to the fuel cell 100 in a state where power is not output to the load device 510.

Since the parking-time residual water scavenging determination is periodically performed, as compared with the configuration in which an upper value is set on the number of times the parking-time residual water scavenging determination is performed, it is possible to more reliably suppress the freezing of water in the fuel cell system 10, and it is possible to increase the possibility that the completion-time residual water scavenging is performed with timing at which the temperature of the purge valve 260 is closer to 0 degrees Celsius. Thus, it is possible to increase the possibility that the scavenging is performed in a state where a larger amount of water vapor within the atmosphere is condensed.

B. Variations

B1. Variation 1:

Although in the embodiment described above, the conditions in which the scavenging is decided to be performed in the completion-time residual water scavenging determination processing are that "the current outside temperature is equal to or less than −5 degrees Celsius, and that the average lowest temperature in the preceding three days is equal to or less than 0 degrees Celsius", the present invention is not limited to this. For example, as the current temperature, instead of −5 degrees Celsius, an arbitrary temperature may be adopted. Instead of the average lowest temperature in the preceding three days, an arbitrary temperature, such as the average lowest temperature in the preceding one week or the lowest temperature in the preceding three days, that correlates with the lowest temperature in parking may be adopted. The average lowest temperature in the preceding three days is not limited to 0 degrees Celsius, and an arbitrary temperature close to 0 degrees Celsius may be adopted. Arbitrary conditions in which the temperature of the fuel cell 100 is estimated to be equal to or less than 0 degrees Celsius, such as "the current outside temperature is 0 degrees Celsius, and the change in the lowest temperature in the preceding three days is a monotonic reduction" may be adopted.

B2. Variation 2:

Although in the embodiment described above, the conditions in which the parking-time residual water scavenging processing is decided to be performed in the parking-time residual water scavenging determination processing are that "the temperature of the purge valve 260 is equal to or less than 0 degrees Celsius", the present invention is not limited to this. For example, conditions in which the temperature of the purge valve 260 is equal to or less than an arbitrary threshold value different from 0 degrees Celsius may be adopted. Instead of the temperature of the purge valve 260 or in addition to the temperature of the purge valve 260, conditions in which the temperature of the back pressure valve 340 is equal to or less than 0 degrees Celsius may be adopted. As with the purge valve 260, in the fuel cell system 10, the back pressure valve 340 can be arranged most vertically downward as compared with the constituent elements other than the second fuel gas discharge path 262, the oxidizer gas discharge path 332 and the purge valve 260. Hence, since the purge valve 260 is more likely to be affected by the outside temperature, and water is more likely to be stored therein, when the outside temperature is lowered, water can be frozen with relatively early timing. Therefore, the conditions in which the temperature of the back pressure valve 340 is equal to or less than 0 degrees Celsius is adopted, and thus it is possible to prevent water from being frozen in almost all portions at least on the cathode side. In the configuration in which in the second fuel gas discharge path 262, a valve different from the purge valve 260 is provided, conditions in which the temperature of the valve is equal to or less than 0 degrees Celsius may be adopted. In the configuration in which in the oxidizer gas discharge path 332, a valve different from the back pressure valve 340 is provided, conditions in which the temperature of the valve is equal to or less than 0 degrees Celsius may be adopted. In other words, in general, conditions in which the temperature of at least one of a valve provided in a flow path for discharging water in the fuel gas supply/discharge mechanism 200 and a value provided in a flow path for discharging water in the oxidizer gas supply/discharge mechanism 300 is equal to or less than 0 degrees Celsius may be adopted.

B3. Variation 3:

Although in the embodiment described above, the fuel cell system 10 is used as a system for supplying power for driving by being mounted on the fuel cell automobile, the present invention is not limited to this. For example, instead of the fuel cell automobile, the fuel cell system 10 may be used to be mounted on another arbitrary moving body such as an electric automobile that needs power for driving. The fuel cell system 10 may be used to be installed as a stationary power source, for example, in an office and a household, indoors or outdoors. Although each unit cell 110 included in the fuel cell 100 is a unit cell for a solid polymer-type fuel cell, the unit cell 110 may be configured as unit cells for various types of fuel cells such as a phosphoric acid-type fuel cell, a molten carbonate-type fuel cell and a solid oxide-type fuel cell.

B4. Variation 4:

Although in the embodiment described above, the outside temperature map is used to estimate the outside temperature, and the purge valve temperature map is used to estimate the temperature of the purge valve, the present invention is not limited to this. For example, with a relational formula indicating a relationship between the fuel cell temperature, the degree of variation in the fuel cell temperature and the outside temperature, computation may be performed to estimate the outside temperature. Likewise, with a relational formula indicating a relationship between the fuel cell temperature, the outside temperature and the temperature of the purge valve 260, computation may be performed to estimate the temperature of the purge valve 260.

B5. Variation 5:

The configuration of the fuel cell system 10 in the embodiment described above is simply an example, and various modifications are possible. For example, a configuration may be adopted in which the second fuel gas discharge path 262 and the oxidizer gas discharge path 332 are not connected and they independently discharge the off-gas. A configuration may be adopted in which instead of the control device 600, the startup control device 700 includes the parking-time residual water scavenging determination portion 620 and the operation control portion 660. In this configuration, as long as in parking, the parking-time residual water scavenging processing is not performed, the power source of the control device 600 can be kept off. In the parking-time residual water scavenging processing, regardless of whether or not the completion-time residual water scavenging is performed, the scavenging may be performed either on the anode side or the cathode side. Even in this configuration, since as the completion-time residual water scavenging, the scavenging on the anode side can be omitted, it is possible to reduce the power consumption. In addition, it is possible to omit the processing that stores, in the scavenging history storage portion 680, the history of whether or not the completion-time residual water scavenging is performed, and thus it is possible to reduce the time for performing the scavenging processing. Although in the embodiment described above, in parking, the control device 600 is periodically started up to perform the parking-time residual water scavenging determination, instead of this configuration, for example, when only a predetermined period has elapsed after the performance of the completion-time residual water scavenging determination, the parking-time residual water scavenging determination may be performed only once. Normal discharge processing may be performed while the residual water scavenging processing is being performed. For example, even after the performance of the completion-time residual water scavenging, the normal discharge processing may be performed with timing before the wake-up timer is set.

B6. Variation 6:

In the embodiment described above, part of the configuration realized by hardware may be replaced with software, and on the other hand, part of the configuration realized by software may be replaced with hardware. When part or the whole of the function of the present invention is realized by software, the software (computer programs) can be provided as a form that is stored in a computer-readable recording medium. The "computer-readable recording medium" includes not only portable recording media such as a flexible disk and a CD-ROM but also internal storage devices within computers such as a RAM and a ROM and external storage devices fixed to computers such as a hard disk. In other words, the "computer-readable recording medium" has a broad meaning including arbitrary recording media that can fix data not temporarily.

The present invention is not limited to the embodiment and variations described above, and can be realized in various configurations without departing from the spirit thereof. For example, the technical features of the embodiment and variations corresponding to the technical features in the aspects described in the section of SUMMARY can be replaced or combined as necessary so that part or the whole of the problem describe previously is solved or part or the whole of the effects described previously is achieved. When the technical features are not described as essential features in the present specification, they can be deleted as necessary.

What is claimed is:

1. A residual water scavenging processing method in a fuel cell system including a fuel gas supply/discharge mechanism and an oxidizer gas supply/discharge mechanism, the method comprising:
    a first prediction step of predicting, while the fuel cell system is operated, whether or not an outside temperature of the fuel cell system becomes equal to or less than a first predetermined temperature;
    a step of performing, when in the first prediction step, it is predicted that the outside temperature becomes equal to or less than the first predetermined temperature, residual water scavenging processing on only the oxidizer gas supply/discharge mechanism among the fuel gas supply/discharge mechanism and the oxidizer gas supply/discharge mechanism and thereafter stopping the operation of the fuel cell system;
    a second prediction step of predicting, after stop of the operation of the fuel cell system, whether or not a temperature of a purge valve arranged in a fuel gas discharge path in the fuel cell system becomes equal to or less than a second predetermined temperature; and
    a step of performing the residual water scavenging processing on only the fuel gas supply/discharge mechanism among the fuel gas supply/discharge mechanism and the oxidizer gas supply/discharge mechanism when in the second prediction step, it is predicted that the temperature of the purge valve becomes equal to or less than the second predetermined temperature,
    wherein the step of performing the residual water scavenging processing on only the fuel gas supply/discharge mechanism includes:
        opening the purge valve to discharge water separated from an off-gas discharged from the fuel cell; and
        supplying a predetermined amount of fuel gas to the fuel cell.

2. The residual water scavenging processing method according to claim 1, further comprising:
    a step of storing, in a storage device included in the fuel cell system, data associated with whether or not the residual water scavenging processing has been performed on the oxidizer gas supply/discharge mechanism, and
    a step of performing the residual water scavenging processing on both the fuel gas supply/discharge mechanism and the oxidizer gas supply/discharge mechanism when in the second prediction step, it is predicted that the temperature of the purge valve becomes equal to or less than the second predetermined temperature and when before the stop of the operation of the fuel cell system, the residual water scavenging processing is not performed on the oxidizer gas supply/discharge mechanism.

3. The residual water scavenging processing method according to claim 1,
    wherein the first predetermined temperature is equal to or less than 0 degrees Celsius.

4. The residual water scavenging processing method according to claim 1,
    wherein the second predetermined temperature is 0 degrees Celsius.

5. A fuel cell system comprising:
    a fuel cell;
    a fuel gas supply/discharge mechanism that supplies a reaction gas to the fuel cell and that discharges, from the fuel cell, an off-gas related to the reaction gas;
    a fuel gas discharge path;
    a purge valve configured to be arranged in the fuel gas discharge path to discharge water separated from the off-gas related to the reaction gas discharged from the fuel cell;
    an oxidizer gas supply/discharge mechanism that supplies an oxidizer gas to the fuel cell and that discharges, from the fuel cell, an off-gas related to the oxidizer gas;
    a first prediction portion that predicts, while the fuel cell system is operated, whether or not an outside temperature becomes equal to or less than a first predetermined temperature;
    a cathode-side scavenging processing portion that performs residual water scavenging processing on only the oxidizer gas supply/discharge mechanism among the fuel gas supply/discharge mechanism and the oxidizer gas supply/discharge mechanism when it is predicted that the outside temperature becomes equal to or less than the first predetermined temperature;
    an operation control portion that stops the operation of the fuel cell system after the residual water scavenging processing is performed on the oxidizer gas supply/discharge mechanism;

a second prediction portion that predicts, after the stop of the operation of the fuel cell system, whether or not a temperature of the purge valve included in the fuel cell system becomes equal to or less than a second predetermined temperature; and an anode-side scavenging processing portion that performs the residual water scavenging processing on only the fuel gas supply/discharge mechanism among the fuel gas supply/discharge mechanism and the oxidizer gas supply/discharge mechanism when the second prediction portion predicts that the temperature of the purge valve becomes equal to or less than the second predetermined temperature and that fails to perform the residual water scavenging processing on the fuel gas supply discharge mechanism when the first prediction portion predicts that the outside temperature becomes equal to or less than the first predetermined temperature, wherein the residual water scavenging processing on only the fuel gas supply/discharge mechanism includes:
opening the purge valve; and
supplying a predetermined amount of fuel gas to the fuel cell.

6. The fuel cell system according to claim 5, further comprising:

a storage device that stores data associated with whether or not the residual water scavenging processing has been performed on the oxidizer gas supply/discharge mechanism, wherein when the second prediction portion predicts that the temperature of the purge valve becomes equal to or less than the second predetermined temperature and when before the stop of the operation of the fuel cell system, the residual water scavenging processing is not performed on the oxidizer gas supply/discharge mechanism, the anode-side scavenging processing portion performs the residual water scavenging processing on the fuel gas supply/discharge mechanism, and the cathode-side scavenging processing portion performs the residual water scavenging processing on the oxidizer gas supply/discharge mechanism.

7. The fuel cell system according to claim 5,
wherein the first predetermined temperature is equal to or less than 0 degrees Celsius.

8. The fuel cell system according to claim 5,
wherein the second predetermined temperature is 0 degrees Celsius.

* * * * *